P. G. WARNOCK.
CASH REGISTER SYSTEM.
APPLICATION FILED JULY 13, 1909.
955,621.
Patented Apr. 19, 1910.
3 SHEETS—SHEET 1.
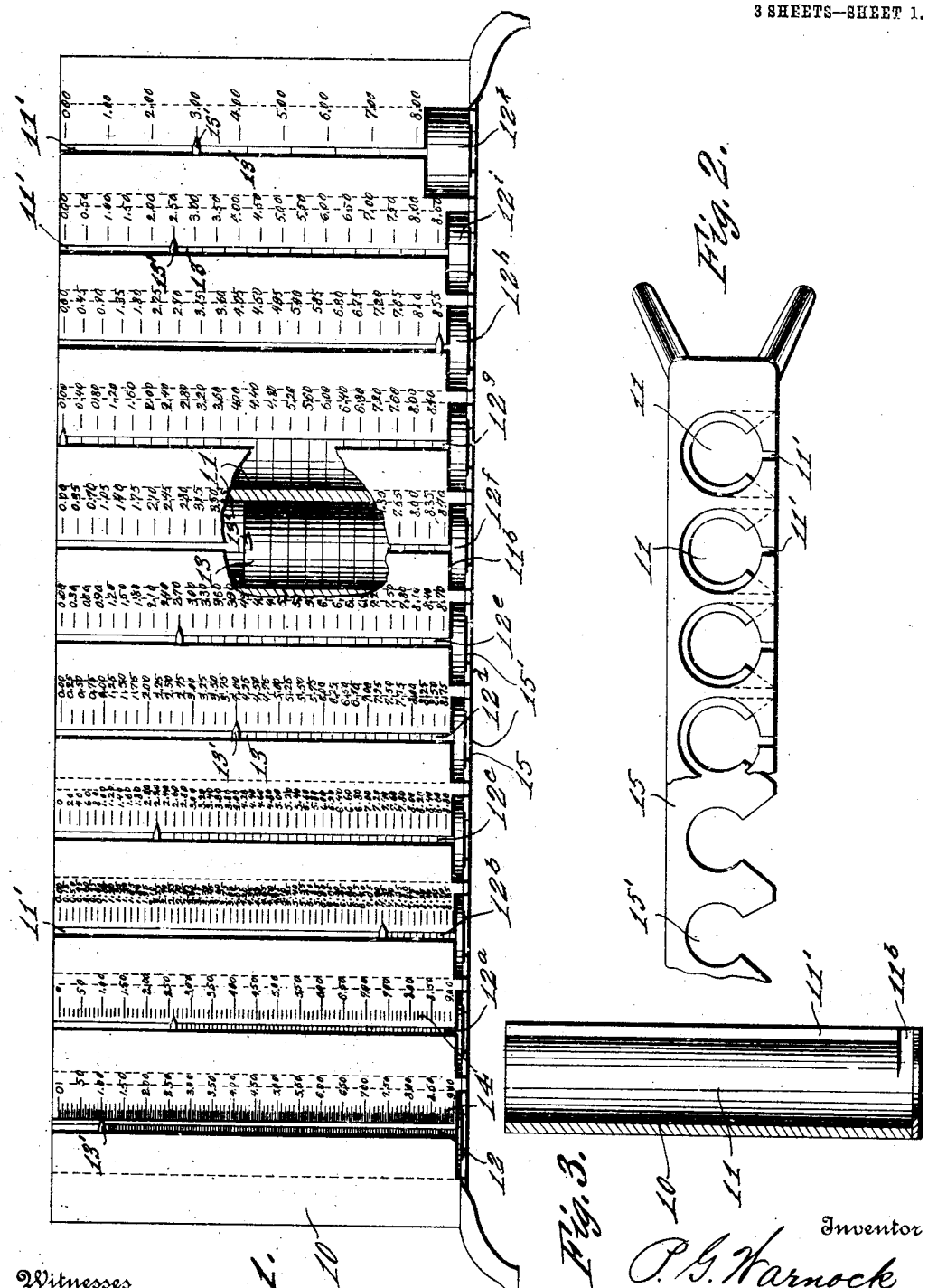

P. G. WARNOCK.
CASH REGISTER SYSTEM.
APPLICATION FILED JULY 13, 1909.
955,621.
Patented Apr. 19, 1910.
3 SHEETS—SHEET 2.
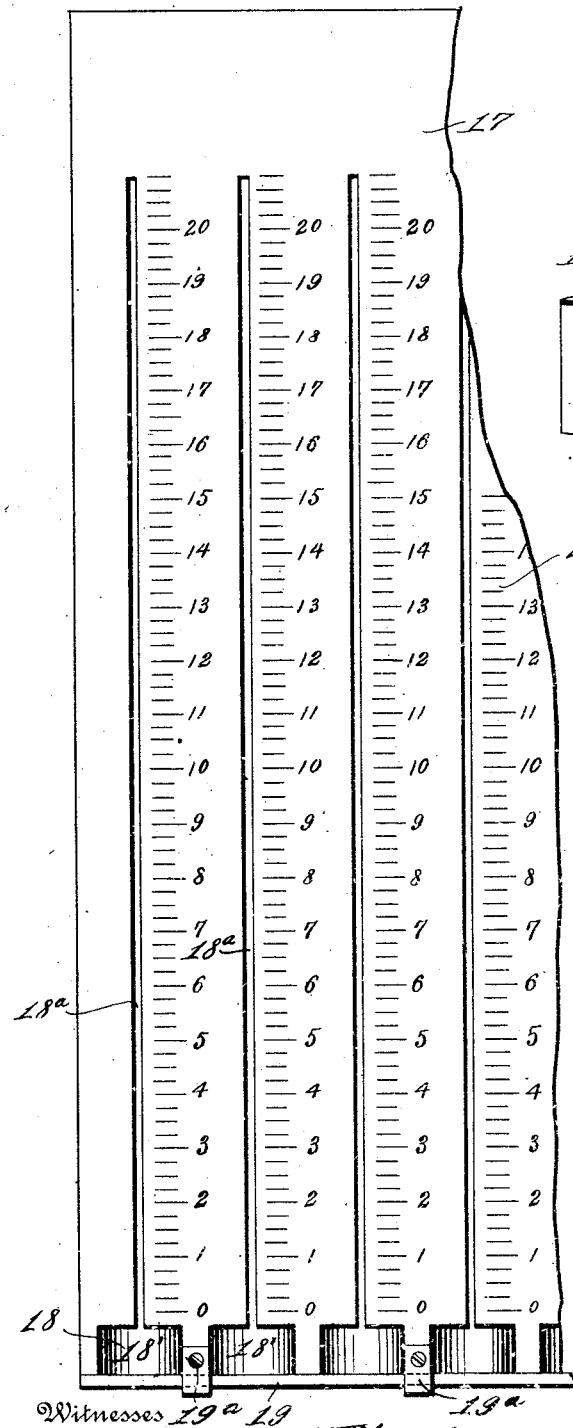
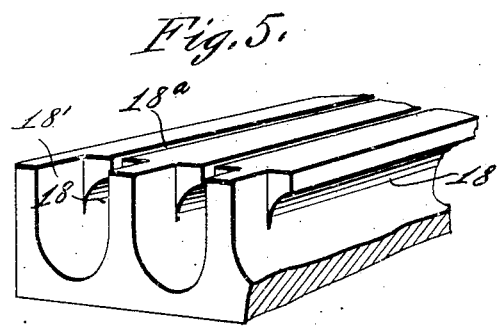
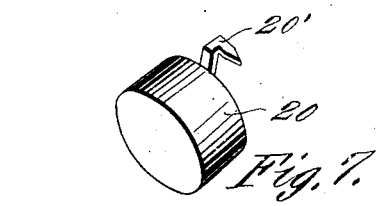
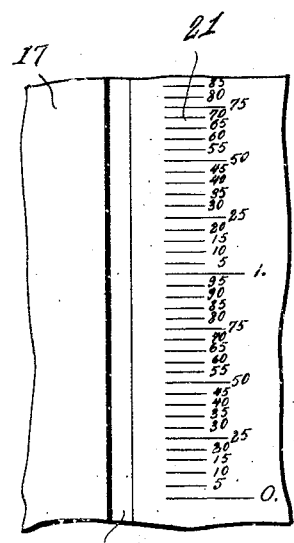

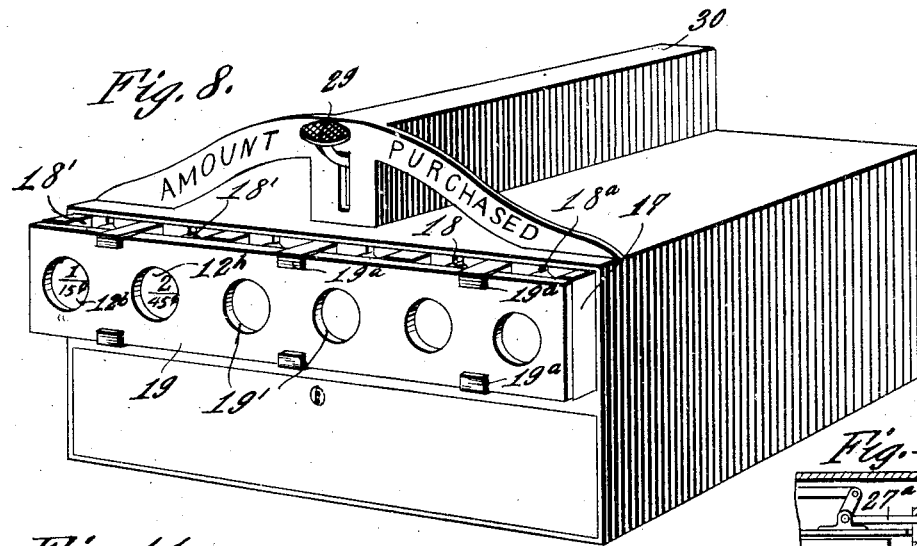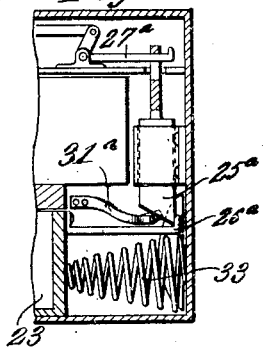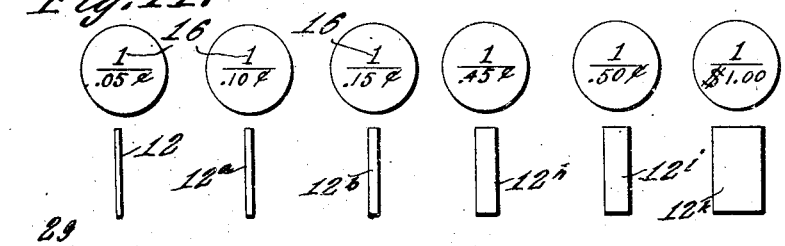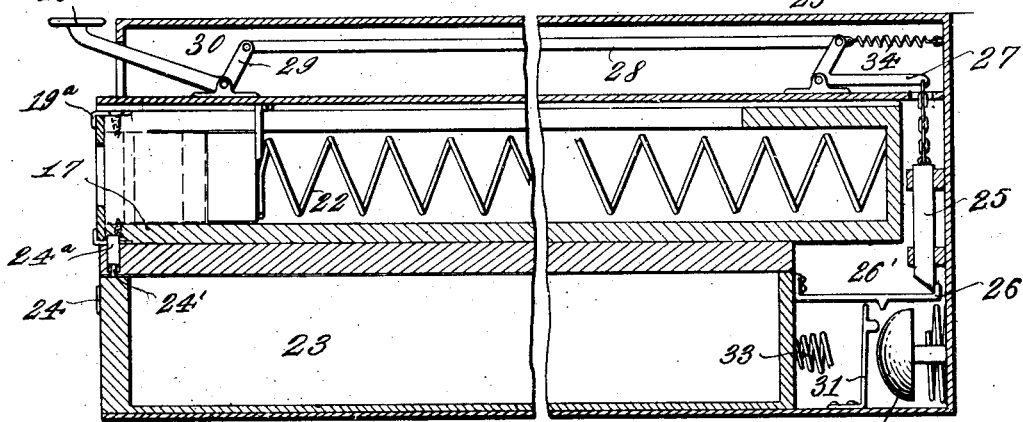

UNITED STATES PATENT OFFICE.

PHILIP G. WARNOCK, OF EVERETT, WASHINGTON.

CASH-REGISTER SYSTEM.

955,621.   Specification of Letters Patent.   Patented Apr. 19, 1910.

Application filed July 13, 1909. Serial No. 507,397.

*To all whom it may concern:*

Be it known that I, PHILIP G. WARNOCK, a citizen of the United States, residing at Everett, in the county of Snohomish and State of Washington, have invented certain new and useful Improvements in Cash-Register Systems, of which the following is a specification.

This invention relates to apparatus or systems for recording or registering business transactions, and has particular reference to devices of this character which are intended to be used in shops or stores for the purpose of indicating in a simple and effective manner amounts of sales or business operations.

For a full understanding of the invention reference is to be had to the detail description and accompanying drawings, in which—

Figure 1 is a side elevation of a portion of the invention, partly broken away; Fig. 2 is a fragmentary plan view of the device shown in Fig. 1; Fig. 3 is a vertical transverse section through the same structure; Fig. 4 is a plan view of a portion of another part of the invention, hereinafter described; Fig. 5 is a fragmentary perspective view of the same part; Fig. 6 is a fragment of the same structure as is shown in Fig. 4, and on an enlarged scale; Fig. 7 is a detail perspective view of a follower to be employed in connection with the receiver shown in Figs. 4 to 6; Fig. 8 is a perspective view of a device including a receiver substantially similar to that just mentioned and also shown in connection with a cash drawer; Fig. 9 is a vertical central longitudinal section of the device shown in Fig. 8; Fig. 10 is a view similar to Fig. 9, but of a modified construction and partly broken away, and Fig. 11 is a diagrammatic representation in elevation and face views of a series of disks or checks to be employed in this apparatus and indicating the different values desired.

Throughout the following description and on the several figures of the drawings similar parts are referred to by like reference characters.

This invention has been designed primarily for use in barber shops, and for convenience of description and understanding its use will be so considered as this specification proceeds, but it is to be understood that the invention is by no means limited to such use.

As indicated in Fig. 1 a holder or receptacle 10 is provided and the same is bored to form a series of preferably vertical chambers 11 adapted to receive sets of checks 12, $12^a$, $12^b$, $12^c$, $12^d$, $12^e$, $12^f$, $12^g$, $12^h$, $12^i$, $12^k$, etc., the checks of each set being of equal thickness, representing distinctive values accordingly. One holder 10 will be understood as being provided for each barber in the shop and before beginning the operations the chambers 11 will be filled with their proper checks. At the top of each set of checks is a follower 13 carrying an index or pointer 13′ projecting outwardly through a slot 11′ and coöperating with graduations 14 on the face of the holder. When all of the chambers are filled with disks or checks the several pointers 13′ will indicate the zero points on the several sets of graduations 14. The check 12 may be regarded as the unit of value and may be considered to represent a purchase or operation amounting to five cents. Check $12^a$ if of double the thickness of check 12 will be considered to represent ten cents, and so on throughout the series. As shown in Fig. 1 there are 11 sets of checks representing values ranging from five cents up to $1.00, but it is to be understood that the invention contemplates the employment of any desired number or relative values of such sets of checks, the illustration being merely suggestive.

The follower 13 may be of any desired thickness, but preferably each follower is designed to be used in its own particular chamber and should be a trifle thicker than each check for said chamber. The bottom plate 15 is provided on the holder 10 to support the several sets of checks, and said plate is provided with openings 15′ of smaller diameter than the checks, said openings being provided for the purpose of permitting the operator's finger to remove the checks from their respective chambers singly, the checks being withdrawn through slots $11^b$ at the bottom of the chambers. The depth of each of said slots $11^b$ is substantially the same as the depth or thickness of the disk or the check to be withdrawn therefrom and not so deep as to prevent the withdrawal of the follower in the adjacent chamber. For the purpose of identifying the checks for each barber, the same are provided with characteristic designations corresponding to such person. For instance as shown in Fig. 11 all of the checks are provided with a designation 16, shown as a numeral 1, and each of the other barbers will be provided with checks having other distinguishing characters. After a customer has been served the barber will withdraw from his holder or cabinet a check corresponding to the amount of such service, such check being passed over to the head barber or boss for record. The follower in the chamber from which said check is drawn will drop to the point indicating the value of the check so withdrawn.

At the close of each day or other period of operations the individual barber may calculate the amount of his operations by summing up the amounts indicated opposite the several indexes 13'. The head or boss barber receiving said checks from the several subordinates will be provided with a single receiver or tray 17, and said tray to be provided with at least as many chambers 18 as there are subordinates. Each of said chambers 18 is for the reception of the checks received from a particular barber. That is to say if the shop has five barbers the tray 17 must be provided with at least five chambers 18, one for each barber. As each check is received from say barber 1, irrespective of the amount of said check, it is placed in chamber 18 representing said barber 1. The tray 17 is provided with an end plate 19, which guards all of said chambers 18. The plate 19 is secured in place by any suitable means, as by sets of hooks 19ᵃ connected to the body of the tray 17 and projecting over the edges of the plate. The tray 17 is preferably maintained in a horizontal position, and each chamber is provided with an end opening 18' large enough to receive the thickest check. Said plate 19, furthermore, is provided with a hole 19' in alinement with each of the chambers 18 for two purposes,—to enable the boss to introduce the checks into the chambers 18 by inserting his thumb or finger therethrough to make a way for the checks to drop into the openings 18' and also to permit the last check so introduced to be seen from the outside of the tray, thus showing the amount of the purchase or operation. Each of the chambers 18 is provided with a follower 20, preferably slightly thicker than said opening 18'. The follower has a pointer or index 20' projecting upwardly or outwardly through a slot 18ᵃ and coöperating with graduations 21 of the face of the tray or receiver 17. Before any chamber 18 has received any checks, its follower 20 will abut against the inner face of the plate 19 and its index 20' will indicate the zero point on the graduations 21. The follower tends to maintain such normal position by virtue of a spring 22 within the chamber, as shown in Fig. 9. When the boss barber receives a check from one of his subordinates he thrusts his thumb or finger through the hole 19' against the follower 20 and drops the check into the opening 18' between the follower and the plate 19, where said check remains until the next operation by the same subordinate. The thickness or value of each and all of the checks received from said particular subordinate will be indicated by index 20' in his particular chamber 18. At the end of the day or other period the boss barber may at a glance determine the amount of operations of each of the subordinates, and such records should of course correspond to the records of the several barbers as shown by the indexes 13' of their cabinets.

The apparatus shown in Figs. 8 and 9 includes also a cash drawer 23, of any suitable interior construction. The drawer 23 is adapted to be locked by means of a locking bolt 24, and also is intended to be normally held closed by finger operated mechanism of suitable construction. As indicated such mechanism includes a sliding bolt 25 adapted to engage a finger 26 connected to the rear end of the drawer. The bolt 25 is adapted to be withdrawn from the finger piece by means of a bell crank 27 having a link 28 connecting it to another bell crank or finger piece 29 extending outwardly at the front of the register. The operating mechanism may be housed as shown at 30, if desired. The tray 17 during the day may be extended from the cabinet sufficiently far to receive the checks, but is adapted to be closed and secured in place by the lock 24 whereby the cash drawer is locked. The bolt 24' of the said lock is adapted to project an auxiliary bolt 25 upwardly to engage the tray 17. The finger 26 is provided with a stud 26' which when the drawer moves outwardly engages and operates a clapper 31, causing the latter to ring a bell 32. The drawer when released is projected by means of a spring 33 of any suitable construction. The bell crank 27 may be held in place by a spring 34 so as to cause the bolt 25 to be maintained in position to interlock with the finger 26 when the drawer is closed.

In the modification shown in Fig. 10 the drawer 23 is provided with a finger 26ᵃ which is adapted to be engaged by a heavy bolt 25ᵃ, being loosely connected with the bell crank 27ᵃ. The bolt just mentioned being weighted requires no spring corresponding to the spring 34 above described in order to maintain it in operative position. In this figure also is shown a slightly different arrangement of clapper 31ᵃ, the same being adapted to be engaged by the point of the finger 26ᵃ. The trays 17 may be made with any desired number of chambers, depending upon the service to be performed. Also one or more of the trays may be employed in connection with any well known type of cash register, as for instance to have them serve as a base on which the cash register may rest.

Having thus described the invention, what is claimed as new is:

1. The hereindescribed registering system comprising, in combination, a cabinet having a series of chambers, sets of checks of different thickness in the several chambers, all of the checks of each set being of the same thickness, and the several checks representing characteristic values by their thickness, means to indicate the value of the checks taken from said cabinet, a tray provided with a chamber to receive the checks removed from said cabinet, and means coöperating with said tray to indicate the value of the checks so received.

2. The hereindescribed registering system comprising, in combination, a cabinet having a series of chambers, sets of checks of different thickness in the several chambers, all of the checks of each set being of the same thickness, and the several checks representing characteristic values by their thickness, means to indicate the value of the checks taken from said cabinet, a tray having a series of chambers adapted to receive checks from several cabinets as aforesaid, and a follower in each of said tray chambers, each of said followers being provided with an index to indicate the values of the checks received in its chamber from each particular cabinet.

3. The hereindescribed registering device comprising, in combination, a cabinet having a series of chambers, sets of checks for each of said chambers, the checks of each set being of the same thickness and those of different sets being of different thickness, means to support the checks in said chambers to permit their withdrawal therefrom singly, means in each of said chambers to indicate the values of the checks withdrawn therefrom, a receiving cabinet including a tray having one or more chambers to receive checks received from the above mentioned cabinet, a plate at the end of said tray having one or more holes alining with said tray chambers, a spring in each of said tray chambers, a follower located between said spring and said plate, a cash drawer, means to temporarily hold said cash drawer closed, and a lock adapted to simultaneously hold the cash drawer and the tray in the cabinet.

In testimony whereof I affix my signature in presence of two witnesses.

PHILIP G. WARNOCK.

Witnesses:
ALVAH E. HARLEY,
F. M. RAYBURN.